United States Patent
Spivey

(10) Patent No.: US 6,173,540 B1
(45) Date of Patent: Jan. 16, 2001

(54) STAIR TREAD

(76) Inventor: Fenner N. Spivey, P.O. Box 819, Louriburg, NC (US) 27549

(*) Notice: Under 35 U.S.C. 154(b), the term of this patent shall be extended for 0 days.

(21) Appl. No.: 09/149,242

(22) Filed: Sep. 8, 1998

Related U.S. Application Data

(60) Provisional application No. 60/058,603, filed on Sep. 12, 1997.

(51) Int. Cl.⁷ .................................................. E04F 11/108
(52) U.S. Cl. .................................. 52/191; 52/182; 52/188
(58) Field of Search .............................. 52/182, 188, 191

(56) References Cited

U.S. PATENT DOCUMENTS

| | | | |
|---|---|---|---|
| 3,393,481 | * | 7/1968 | Meuret ................................. 52/188 |
| 3,909,997 | * | 10/1975 | Eickhof .................................. 52/188 |
| 4,321,293 | * | 3/1982 | Naka ................................... 52/188 X |
| 4,321,294 | * | 3/1982 | Naka ................................... 52/188 X |
| 4,464,870 | * | 8/1984 | Crepeau ................................ 52/188 |
| 4,625,266 | * | 11/1986 | Winter ................................... 52/188 |
| 5,713,166 | * | 2/1998 | Couture ............................... 52/182 X |

* cited by examiner

*Primary Examiner*—Carl D. Friedman
*Assistant Examiner*—Yvonne M. Horton
(74) *Attorney, Agent, or Firm*—Mills Law Firm PLLC

(57) ABSTRACT

An improved stair tread for use in both residential and commercial construction directly beneath carpet and padding material is disclosed. The improved stair tread is fabricated from an engineered wood product such as Oriented Strand Board made of wood strips in a four layer process. Each surface layer is oriented perpendicular to the core layers and bonded with phenolic resin or other similar binding agents under intense heat and pressure to achieve the strength and performance criteria required for stair treads. The improved stair tread is machined from one inch thick structural panels using standard woodworking tools and has excellent workability. The finished stair tread is provided with a rounded, forward edge and a riser groove extending along its entire length. The improved stair tread provides a cost effective alternative to traditional solid wood stair treads.

1 Claim, 1 Drawing Sheet

STAIR TREAD

CROSS-REFERENCE TO RELATED APPLICATION

This Application claims the benefit under 35 U.S.C. 119(e) of U.S. Provisional Application No. 60/058,603 filed Sep. 12, 1997 by Fenner N. Spivey for Stair Tread.

BACKGROUND OF INVENTION

1. Field of Invention

Virtually all buildings having multiple floors are provided with a staircase to permit the occupants to move therebetween. In residential homes a staircase is constructed from so-called risers and stair treads of calculated dimensions based upon the ceiling height and staircase length.

Traditionally such risers and treads have been fabricated from boards of at least 12 inches in width which are clear of knots and are cut from hardwoods such as oak and other varieties. Because such select hardwood boards are dwindling in supply and extremely expensive when available, stair treads have recently been constructed from a plurality of boards which are more narrow and glued together along their adjacent edges. However, in such a construction process it is difficult to match the grains of the woods so that the glue joints are not visible which is undesirable aesthetically. Differences in the moisture content of the boards can also cause construction problems such as warping of the treads.

In a continuing effort to reduce building costs, plywood stair treads have been utilized in those instances where the stairs are to be carpeted. Modernly, engineered wood products such as particle board, chip board, and Oriented Strand Board (OSB) have been used in floor areas and wall and roof sheathing applications, but have been considered lacking in sufficient tensile strength to be used as stair treads.

Thus, the present invention has been developed to provide a stair tread fabricated from an engineered wood product such as Oriented Strand Board which has suitable mechanical and physical characteristics for use as a stair tread in residential construction.

SUMMARY OF THE INVENTION

After much study of the above described problems, the present invention has been developed to provide an improved stair tread manufactured from an engineered composite wood product. Unlike stair treads fabricated from solid wood, plywood, or particle board, the present stair tread is constructed from a structural board that is engineered for specific performance characteristics.

Precisely cut wood strips are mixed with phenolic resin binders or other newly developed binders and constructed in a four layer process including two core layers which lie perpendicular to the two surface layers. The composite board is then cured under intense heat and pressure to form an irreversible bond between the layered materials. This manufacturing process eliminates knot holes, voids, splits, and their related problems.

This combination of engineered design and manufacturing process gives the composite board its inherent strength, stiffness, durability and other desirable physical characteristics.

The present improved stair tread is constructed and graded to meet current industry standards—The Engineered Wood Association (APA) for stair treads and has become widely accepted in residential home construction.

In view of the above, it is an object of the present invention to provide an improved stair tread for use in residential home construction.

Another object of the present invention is to provide an improved stair tread construction from an engineered composite wood material having mechanical and physical properties suitable for this application.

Another object of the present invention is to provide an improved stair tread which meets or exceeds current industry standards for this product for use in commercial and residential construction.

Other objects and advantages of the present invention will become apparent and obvious from a study of the following description and the accompanying drawings which are merely illustrate of such invention.

DETAILED DESCRIPTION OF THE PREFERRED EMBODIMENT

Figure 1:
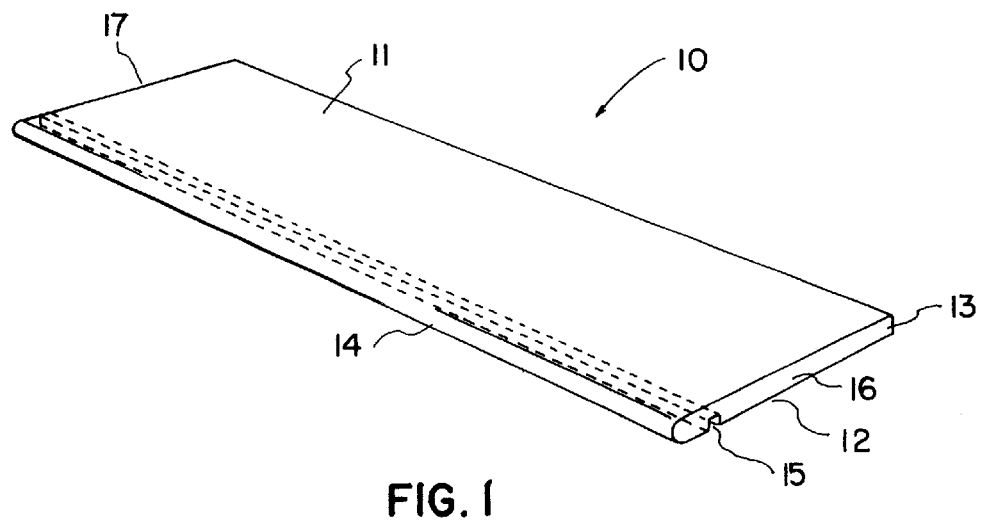
FIG. 1 is a top perspective view of the improved stair tread of the present invention.
Figure 2:
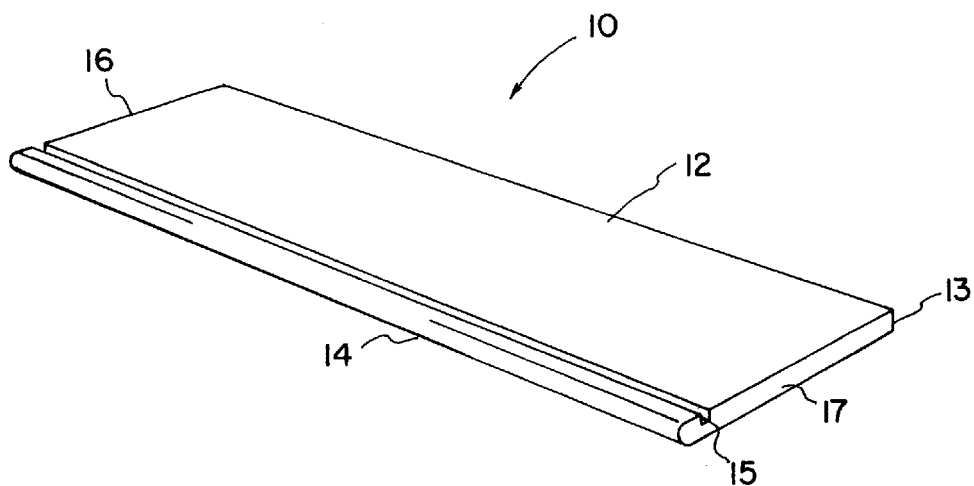
FIG. 2 is a bottom perspective view thereof.
Figure 3:
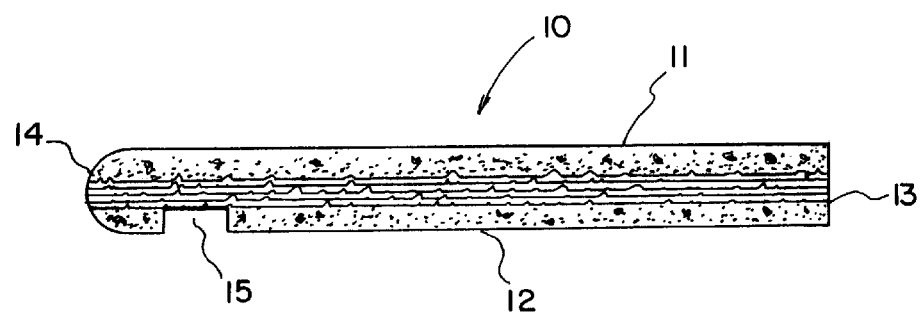
FIG. 3 is a side elevational view thereof.

With further reference to the drawings, there is shown therein an improved stair tread in accordance with the present invention, indicated generally at 10 and illustrated in FIG. 1.

Stair tread 10 is a generally rectangular construction having a top surface 11, a bottom surface 12, a perpendicular butt edge 13, a rounded or bull-nosed forward edge 14 and opposed end surfaces 16 and 17.

The stair tread 10 also includes an elongated riser groove 15 which extends along the entire length of the stair tread 10 in parallel relation to the rounded, forward edge 14 as illustrated. The groove 15 is adapted to receive an upper edge of a so-called riser (not shown) which forms the vertical face of each step in the stair case in a known manner.

Of course, the riser groove 15 may be omitted at the discretion of the manufacturer for specific applications at a customer's request.

The present stair tread 10 is fabricated from an engineered composite wood product known generally as Oriented Strand Board (OSB). Unlike boards from solid wood, plywood, or particle board, Oriented Strand Board is a structural board that is engineered for specific physical and performance characteristics.

In the manufacture of Oriented Strand Board, precisely cut wood strips are mixed with phenolic resin or other similar binding agents in a layering process. More particularly, the cut wood strips are structured in a four-layered process wherein two internal core layers lie perpendicular to the two surface layers. The binding agent is applied to the wood strip materials and thereafter cured under intense heat and pressure to form an irreversible bond between the wood strips.

This manufacturing process eliminates knot holes, voids, splits and similar problems found in other composite materials. This combination of engineering design and a controlled manufacturing process gives the Oriented Strand Board its inherent strength, stiffness, and other desirable physical characteristics.

Oriented Strand Board of the type manufactured by J. M. Huber Corporation, Wood Products Division, Charlotte, N.C. is suitable for this purpose. The Huber Corporation warrants such Oriented Strand Board (OSB) against delamination if properly installed and maintained. In addition, the Oriented Strand Board is inspected and graded to meet industry (APA) standards for stair treads.

Since such Oriented Strand Board is well known to those skilled in the art in other building applications, further detailed discussion of the same is not deemed necessary.

In order to construct the present stair tread 10, the Oriented Strand Board (OSB) is obtained from the supplier in 4 foot×8 foot or 4 foot×12 foot sheets of one inch thickness. The (OSB) sheets (not shown) are cut into boards of the desired size typically 36" long and 12" wide for a residential staircase. Of course, alternate sizes may be utilized according to requirements.

Next, the riser groove 15, if required, is formed along the entire length of the individual stair tread 10 using standard tools suitable for machining Oriented Strand Board (OSB).

Thereafter the rounded, forward edge 14 is formed by the use of a router bit or similar woodworking tool suitable for this purpose.

The cut edges of the stair tread 10 may be sanded using any commercially available abrasive paper to minimize exposure of the wood strip cells to ambient moisture.

The improved stair tread has excellent workability permitting the stair case to be assembled using conventional fasteners in accordance with manufacturers' recommendations.

From the above it can be seen that the improved stair tread of the present invention provides a practical and cost effective alternative for building commercial and residential stair cases which do not require a finished wood appearance.

The improved stair tread is constructed of an engineered wood product such as Oriented Strand Board that achieves the strength and performance criteria of traditional wooden stair treads.

The improved stair tread can be utilized in both residential and commercial construction directly beneath carpet and pad.

Further, the improved stair tread is constructed of materials certified by the APA—The Engineered Wood Association and carries the APA's rated flooring stamp. The material is manufactured in conformance with APA PRP-108, Performance Standard for Wood-Based Structural-Use Panels and is warranted against delamination for a period of 25 years.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. In a stair case comprised of alternating vertical risers and horizontal treads, an improved tread comprising; a tread member having a core layer of wood strips oriented in a first direction and a top layer and a bottom layer of wood strips irreversibly bonded under heat and pressure to said core layer oriented in a second direction transverse to said first direction, said top layer and said bottom layer having parallel spaced top and bottom surfaces establishing a cross sectional thickness, said tread member having parallel laterally spaced side walls and parallel transversely spaced front and rear walls, said front wall having a cylindrical curvature extending between and continuous with said top layer and said bottom layer, said curvature being surface finished to reduce exposure of said layers to ambient moisture, said bottom surface including an elongated groove formed parallel to and closely adjacent said outer surface of said front wall said groove having a thickness substantially the same as the thickness of said tread member whereby a riser for the stair case may be positioned and retained therewithin.

* * * * *